United States Patent
Fan et al.

(10) Patent No.: US 9,703,049 B2
(45) Date of Patent: Jul. 11, 2017

(54) OPTICAL FIBER CORE BUTTING APPARATUS

(71) Applicants: STATE GRID CORPORATION OF CHINA (SGCC), Beijing (CN); STATE GRID NINGBO POWER SUPPLY COMPANY, Zhejiang (CN)

(72) Inventors: Xuefeng Fan, Zhejiang (CN); Jun Qiu, Zhejiang (CN); Xiaozhong Xu, Zhejiang (CN); Hongsheng Yu, Zhejiang (CN); Chengzhi Zhu, Zhejiang (CN); Zhiqiang Xu, Zhejiang (CN); Yize Tang, Zhejiang (CN); Peng Li, Zhejiang (CN); Yunhui Fang, Zhejiang (CN); Liwei Zhang, Zhejiang (CN)

(73) Assignees: State Grid Corporation of China (SGCC), Beijing (CN); State Grid Ningbo Power Supply Company, Zhejiang (CN)

( * ) Notice: Subject to any disclaimer, the term of this patent is extended or adjusted under 35 U.S.C. 154(b) by 0 days.

(21) Appl. No.: 14/908,088

(22) PCT Filed: Nov. 28, 2013

(86) PCT No.: PCT/CN2013/088029
§ 371 (c)(1),
(2) Date: Jan. 27, 2016

(87) PCT Pub. No.: WO2015/014050
PCT Pub. Date: Feb. 5, 2015

(65) Prior Publication Data
US 2016/0170150 A1    Jun. 16, 2016

(30) Foreign Application Priority Data

Aug. 2, 2013 (CN) .......................... 2013 1 0335039

(51) Int. Cl.
*G02B 6/26* (2006.01)
*G02B 6/42* (2006.01)
(Continued)

(52) U.S. Cl.
CPC ......... *G02B 6/3508* (2013.01); *G02B 6/3574* (2013.01); *G02B 6/3806* (2013.01);
(Continued)

(58) Field of Classification Search
CPC .. G02B 6/3502; G02B 6/3508; G02B 6/3564; G02B 6/3568; G02B 6/3574;
(Continued)

(56) References Cited

U.S. PATENT DOCUMENTS 4,955,686 A * 9/1990 Buhrer ................ G02B 6/32
385/17
5,337,378 A * 8/1994 Saito .................... G02B 6/3508
385/136
(Continued)

FOREIGN PATENT DOCUMENTS

CA    2096181 A1    11/1993
CN    1832630 A    9/2006
(Continued)

OTHER PUBLICATIONS

International Search Report and Written Opinion (in Chinese language) issued by the State Intellectual Property Office of the P.R. China, dated May 12, 2014, for International Application No. PCT/CN2013/088029; 14 pages.
(Continued)

*Primary Examiner* — Robert Tavlykaev
(74) *Attorney, Agent, or Firm* — Faegre Baker Daniels LLP (57) ABSTRACT

An optical fiber core butting apparatus comprises a butting panel (1) with multiple butting devices including butting
(Continued)

holes (11), optical fiber core butting connectors and mechanical hands (3); the optical fiber core butting connectors comprise a wire-line connector (21) and a cord-line connector (22); the wire-line connector (21) comprises a first slide bar (211), a first wire-line core connector (212) and a second wire-line core connector (213), and the input terminals and the output terminals of the first and second wire-line core connectors (212, 213) are both connected by connecting fibers; the cord-line connector (22) comprises a second slide bar (221), a first cord-line core connector (222) and a second cord-line core connector (223), and the first and second cord-line connector (222, 223) are connected by a connecting fiber; the mechanical hands (3) are used for holding the core connectors and driving the core connectors to move.

10 Claims, 8 Drawing Sheets

(51) Int. Cl.
*G02B 6/00* (2006.01)
*H04J 14/00* (2006.01)
*G02B 6/35* (2006.01)
*G02B 6/38* (2006.01)
*H04Q 11/00* (2006.01)

(52) U.S. Cl.
CPC .......... *G02B 6/3558* (2013.01); *G02B 6/3809* (2013.01); *H04Q 2011/0024* (2013.01)

(58) Field of Classification Search
CPC ........ G02B 6/3806; G02B 6/44; G02B 6/356; H04Q 3/525; H04Q 3/526; H04Q 2011/0024
USPC ........... 385/20, 22, 17, 25, 134, 147; 398/56
See application file for complete search history.

(56) References Cited

U.S. PATENT DOCUMENTS

| | | | |
|---|---|---|---|
| 5,613,021 A * | 3/1997 | Saito | G02B 6/3502 385/135 |
| 6,307,983 B1 * | 10/2001 | Goossen | G02B 6/3556 385/135 |
| 6,859,575 B1 | 2/2005 | Arol et al. | |
| 7,702,193 B2 | 4/2010 | Arol et al. | |
| 2002/0150322 A1 * | 10/2002 | Wu | G02B 6/3508 385/16 |
| 2002/0172490 A1 * | 11/2002 | Bonja | G02B 6/3644 385/137 |
| 2003/0109142 A1 | 6/2003 | Cable et al. | |
| 2009/0214160 A1 | 8/2009 | Arol et al. | |
| 2010/0220953 A1 * | 9/2010 | Kewitsch | G02B 6/3502 385/17 |
| 2012/0275743 A1 * | 11/2012 | Avrahami | H04Q 1/06 385/16 |

FOREIGN PATENT DOCUMENTS

| | | |
|---|---|---|
| CN | 101099100 A | 1/2008 |
| CN | 101609184 A | 12/2009 |
| CN | 101614846 A | 12/2009 |
| CN | 101614847 A | 12/2009 |
| CN | 101644796 A | 2/2010 |
| CN | 101644798 A | 2/2010 |
| CN | 101655580 A | 2/2010 |
| CN | 101655581 A | 2/2010 |
| CN | 201477231 U | 5/2010 |
| CN | 201489143 U | 5/2010 |
| CN | 201489147 U | 5/2010 |
| CN | 201489150 U | 5/2010 |
| CN | 201489151 U | 5/2010 |
| CN | 201497819 U | 6/2010 |
| CN | 102012540 A | 4/2011 |
| CN | 103412375 A | 11/2013 |
| JP | 05297296 A2 | 11/1998 |
| JP | 2004520733 A | 7/2004 |
| JP | 2009238988 A2 | 10/2009 |
| WO | WO2010103465 A2 | 9/2010 |

OTHER PUBLICATIONS

International Search Report (translated to English language) issued by the State Intellectual Property Office of the P.R China, dated May 12, 2014, for related International Application No. PCT/CN2013/088029; 3 pages.
First Office Action issued by Japan Office Action, Feb. 7, 2017, re Japanese Application No. 2016-530307, Japanese language and English summary, 4 pages.
European Patent Office Supplemental Search Report dated Apr. 5, 2017 re European Patent Application No. 13890853.8, 7 pages.

* cited by examiner

Fig. 13

OPTICAL FIBER CORE BUTTING APPARATUS

CROSS-REFERENCE TO RELATED APPLICATIONS

The present application is a national phase of International Application No. PCT/CN2013/088029, filed on Nov. 28, 2013, entitled "OPTICAL FIBER CORE BUTTING APPARATUS", which claims priority to Chinese Patent Application No. 201310335039.4, entitled "OPTICAL FIBER CORE BUTTING APPARATUS", filed with the Chinese State Intellectual Property Office on Aug. 2, 2013, both of which are expressly incorporated herein in their entireties.

FIELD

The present disclosure relates to the field of optical fiber communication, and in particular to an apparatus for butting optical fiber cores.

BACKGROUND

With the rapid development of power grid construction and improvement of equipment automation in power system, the power optical fiber communication network has been developed unprecedentedly.

Currently, the optical fiber network, which is the basic bearing network for optical fiber communication, is operated and maintained manually, i.e., it requires artificial operations of fiber-jumping on site to realize butting and exchanging between different optical fibers. However, due to dispersed geographic locations and complicated operations of artificial rearrangement, the artificial operations lead to a huge workload and are time-consuming in everyday life, thus the realization of butting and exchanging between optical fiber cores becomes an issue which people are concerned about. Automatic butting devices for optical fiber cores have not be realized in conventional optical fiber communication network devices.

SUMMARY

To address the above problems, an apparatus for butting optical fiber cores is provided according to embodiments of the disclosure, to realize automatic butting of optical fiber cores.

To address the above problems, the following technical solution is provided.

An apparatus for butting optical fiber cores is provided. The apparatus includes:
  a butting plate with a plurality of butting devices, wherein each of the plurality of butting devices comprise a butting hole in a center of the butting device;
  a connector for butting the optical fiber cores, wherein the connector for butting the optical fiber cores is fixed on the butting plate and comprises a plurality of line connectors parallel to each other and a plurality of cord connectors parallel to each other, wherein each of the plurality of line connectors comprises a first slide bar, a first line fiber core connector and a second line fiber core connector, both of the first line fiber core connector and the second line fiber core connector being slidable along the first slide bar, an input end and an output end of the first line fiber core connector being connected to each other through a connection optical fiber, and an input end and an output end of the second line fiber core connector being connected to each other through a connection optical fiber, and wherein each of the plurality of cord connectors comprises a second slide bar, a first cord fiber core connector and a second cord fiber core connector, both of the first cord fiber core connector and the second cord fiber core connector being slidable along the second slide bar, the first cord fiber core connector and the second cord fiber core connector being connected to each other through a connection optical fiber; and
  a manipulator configured to grip the fiber core connectors and drive the fiber core connectors to move.

Preferably, each of the plurality of butting devices further includes:
  a plurality of arc-shaped holes distributed around a circumference of each of the butting holes, wherein two ends of each of the plurality of arc-shaped holes are far away from the butting hole; and
  a plurality of embossments provided, along radial directions of the plurality of arc-shaped holes and opposite to the arc-shaped holes, on an inner wall of each of the butting holes, wherein each of the plurality of embossments corresponds to a respective one of the plurality of arc-shaped holes.

Preferably, the plurality of arc-shaped holes are evenly distributed around the circumference of the butting hole.

Preferably, number of the plurality of arc-shaped holes is 4.

Preferably, the connection optical fiber is wrapped by a drag chain.

Preferably, each of the fiber core connectors includes:
  a connecting portion;
  a fixing portion having a cavity, wherein the cavity passes through the fixing portion from left side to right side of the fixing portion, and two through-holes are provided side-by-side at the bottom of the cavity; and
  two optical fiber core connecting flanges, wherein one end of each of the optical fiber core connecting flanges is fixed in one of the through-holes, the other end includes a second cylinder portion for fixing an external optical fiber core, and at least one of the optical fiber core connecting flanges has a stepped through-hole.

Preferably, the connecting portion comprises an upper part and a lower part, and in a direction perpendicular to a passing-through direction of the cavity, a cross section area of the upper part of the connecting portion is larger than a cross section area of the lower part of the connecting portion, and a groove shape is formed by the upper part of the connecting portion, the lower part of the connecting portion, and the fixing portion.

Preferably, the manipulator includes a first transmission gear and a plug which is embedded partly in the first transmission gear, wherein embedding portions of the first transmission gear and the plug form a thread-screw structure, and the plug has a grip portion in a lower part of the plug to grip the fiber core connectors.

Preferably, the manipulator further includes:
  two bearings which are provided on a top surface and a bottom surface of the first transmission gear to fix the first transmission gear.

Preferably, the manipulator further includes:
  a second transmission gear engaging with the first transmission gear, wherein, when rotating transversely, the second transmission gear drives the first transmission gear to rotate transversely in a direction opposite to a direction in which the second transmission gear rotates transversely; and a power output portion fixedly connected to the second transmission gear to transfer kinetic energy to the second transmission gear; and a motor for driving the power output portion.

Compared to conventional technology, the technical solution mentioned above has the following merits.

The technical solution provided according to the embodiments of the disclosure includes a butting plate, a connector for butting optical fiber cores and a manipulator. The connector for butting optical fiber cores include a plurality of line connectors parallel to each other and a plurality of cord connectors parallel to each other, wherein each of the plurality of line connectors comprises a first slide bar, a first line fiber core connector and a second line fiber core connector, both of the first line fiber core connector and the second line fiber core connector being slidable along the first slide bar, an input end and an output end of the first line fiber core connector being connected to each other through a connection optical fiber, and an input end and an output end of the second line fiber core connector being connected to each other through a connection optical fiber, and wherein each of the plurality of cord connectors comprises a second slide bar, a first cord fiber core connector and a second cord fiber core connector, both of the first cord fiber core connector and the second cord fiber core connector being slidable along the second slide bar, the first cord fiber core connector and the second cord fiber core connector being connected to each other through a connection optical fiber.

In specific implementations, one end of the external line optical fiber core enters into the input end of the first line fiber core connector (or the second line fiber core connector), then passes through the connection optical fiber, and exits from the output end of the first line fiber core connector (or the second line fiber core connector). The first cord fiber core connector and the second cord fiber core connector of the cord connector are controlled by the manipulator to be moved to output ends of the first line fiber core connectors (or the second line fiber core connectors) connected with different line fibers. Then the first cord fiber core connector and the second cord fiber core connector of the cord connector butt output ends of the first line fiber core connectors (or the second line fiber core connectors) connected with different line fibers, thus an optical path is formed between different lines through the first line fiber core connectors (or the second line fiber core connectors) connected with different line fibers and the butted cord connectors. Automatic butting for different line optical fibers in the optical fiber network is realized, the operation is simple, manual intervention is greatly reduced, a large amount of manpower and materials are saved, and work efficiency is improved.

BRIEF DESCRIPTION OF THE DRAWINGS

The drawings to be used in the description of embodiments or the conventional technology are described briefly hereinafter, to make technical solutions according to the embodiments of the disclosure or conventional technology clearer. Apparently, the drawings in the following description only illustrate some embodiments of the disclosure. For those skilled in the art, other drawings may be obtained based on these drawings without any creative effort.

DETAILED DESCRIPTION

The implementations of the disclosure are described in detail in conjunction with drawings, to make the objects, features and merits of the invention more obvious.

Details are illustrated in the description hereinafter to make the disclosure to be understood comprehensively. The invention may be implemented in other ways different from the description, and be extended by those skilled in the art without departing from the invention. The invention is not limited to the following embodiments.

A First Embodiment

Figure 1:
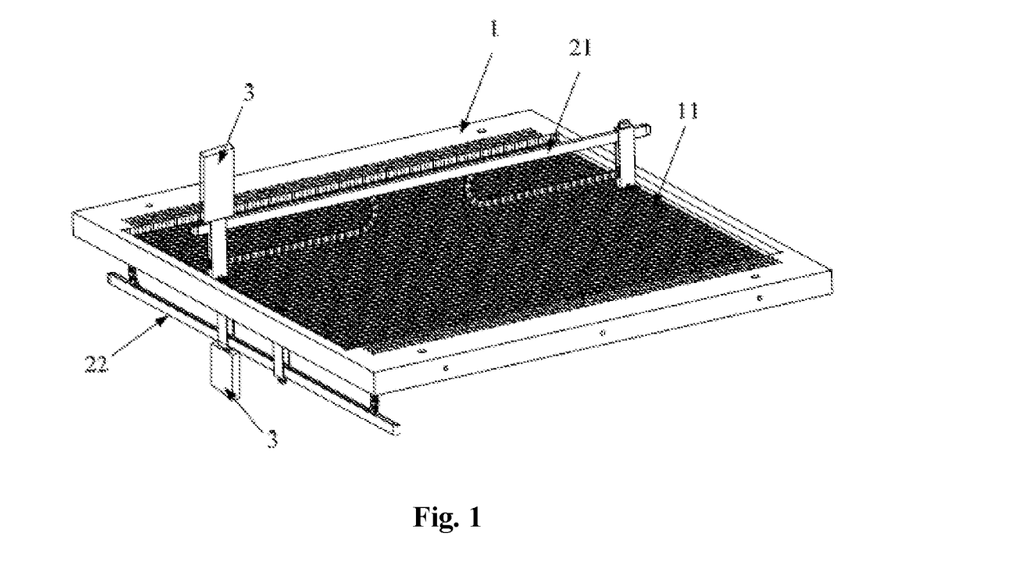
FIG. 1 is a structure diagram of an apparatus for butting optical fiber cores according to an embodiment of the disclosure.

Referring to FIG. 1, an apparatus for butting optical fiber cores is provided according to an embodiment of the invention. The apparatus includes the following components.

A butting plate 1 includes multiple butting devices. Each of the butting devices includes a butting hole 11 in its center.

Figure 2:
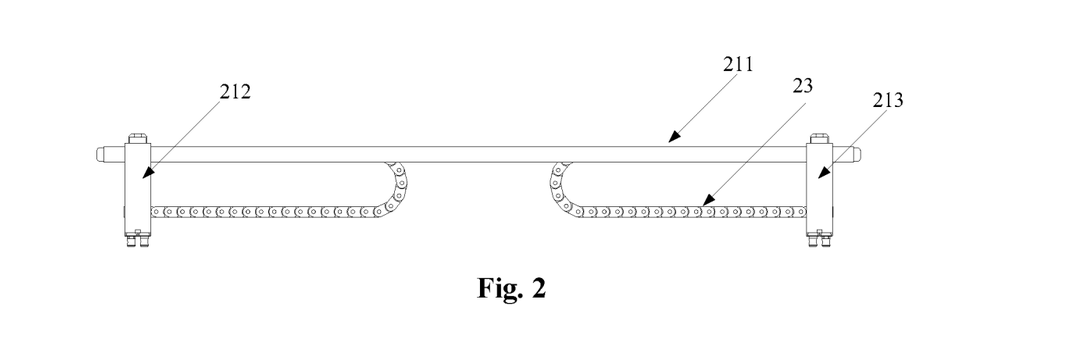
FIG. 2 is a structure diagram of a line connector of an apparatus for butting optical fiber cores according to an embodiment of the disclosure.
Figure 3:
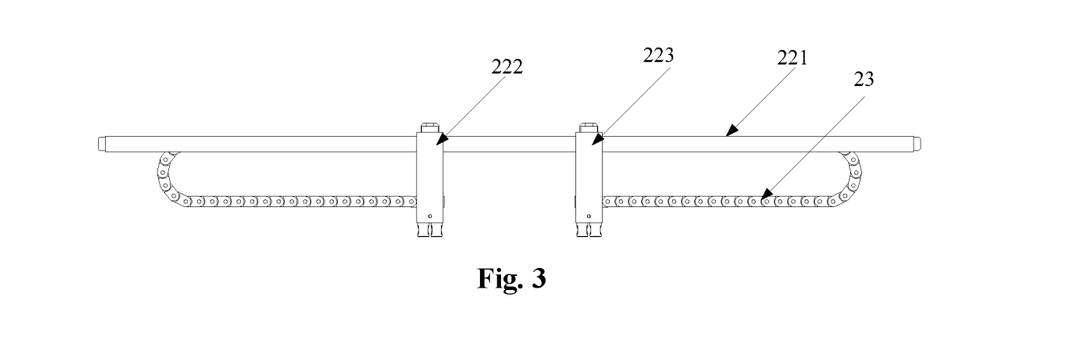
FIG. 3 is a structure diagram of a cord connector of an apparatus for butting optical fiber cores according to an embodiment of the disclosure.

A connector 2 for butting optical fiber cores is fixed on the butting plate 1. The connector for butting optical fiber cores includes several line connectors 21 parallel to each other and several cord connectors 22 parallel to each other. As shown in FIG. 2, each of the line connectors 21 include a first slide bar 211, a first line fiber core connector 212 and a second line fiber core connector 213. The first line fiber core connector 212 and the second line fiber core connector 213 both may slide along the first slide bar 211. An input end and an output end of the first line fiber core connector 212 are connected through a connection optical fiber. An input end and an output end of the second line fiber core connector 213 are connected through a connection optical fiber. As shown in FIG. 3, each of the cord connectors 22 include a second slide bar 221, a first cord fiber core connector 222 and a second cord fiber core connector 223. The first cord fiber core connector 222 and the second cord fiber core connector 223 both may slide along the second slide bar 221. The first cord fiber core connector 222 and the second cord fiber core connector 223 are connected through a connection optical fiber.

Manipulators 3 are configured to grip the fiber core connectors and drive movement of the fiber core connectors to move.

Preferably, according to an embodiment of the disclosure, the connection optical fiber is wrapped by a drag chain 23, so that the connection optical fiber is fixed in an interior space of the drag chain 23. Thus interferences between optical fibers are avoided.

It should be noted that, the fiber core connectors according to the embodiment of the disclosure may be the first cord fiber core connector 222 and the second cord fiber core connector 223 in the cord connector 22, or may be the first line fiber core connector 212 and the second line fiber core connector 213 in the line connector 21, which is not limited herein.

When working, as shown in FIG. 1, the line connector 21 and the cord connector 22 are installed on both sides of the butting plate 1 in a manner that the installation directions of the first slide bar 211 and the second slide bar 221 are perpendicular to each other. In the following, the butting plate 1 of the apparatus for butting optical fiber cores, which is an optical fiber core butting plate with 24*24 butting devices, is taken as an example for description. It should be noted that, those skilled in the art may understand that the apparatus for butting optical fiber cores according to the embodiment of the disclosure is not limited to a butting apparatus including an optical fiber core butting plate with 24*24 butting devices, and may include a butting apparatus including an optical fiber core butting plate with a different number, i.e., 48*48 or 96*96, of butting devices, which depends on different situations. Since the operating principle is basically the same, it is not repeated in the embodiment.

Each line connector corresponds to a respective row of butting holes in the optical fiber core butting plate with 24*24 butting devices. It should be noted that, the row and column are not absolute, as the selection of a coordinate system is not absolute. An original "row" may be viewed as a "column" from a different perspective. Thus, those skilled in the art should understand that, the row and column are interchangeable according to the embodiment of the disclosure. The case that each line connector corresponds to a row of butting holes is taken as an example for illustration. In the example, each line connector can only move along the row corresponding to the line connector and can only be inserted into butting holes in the row corresponding to the line connector, i.e., the butting holes are divided into multiple rows.

Figure 4:
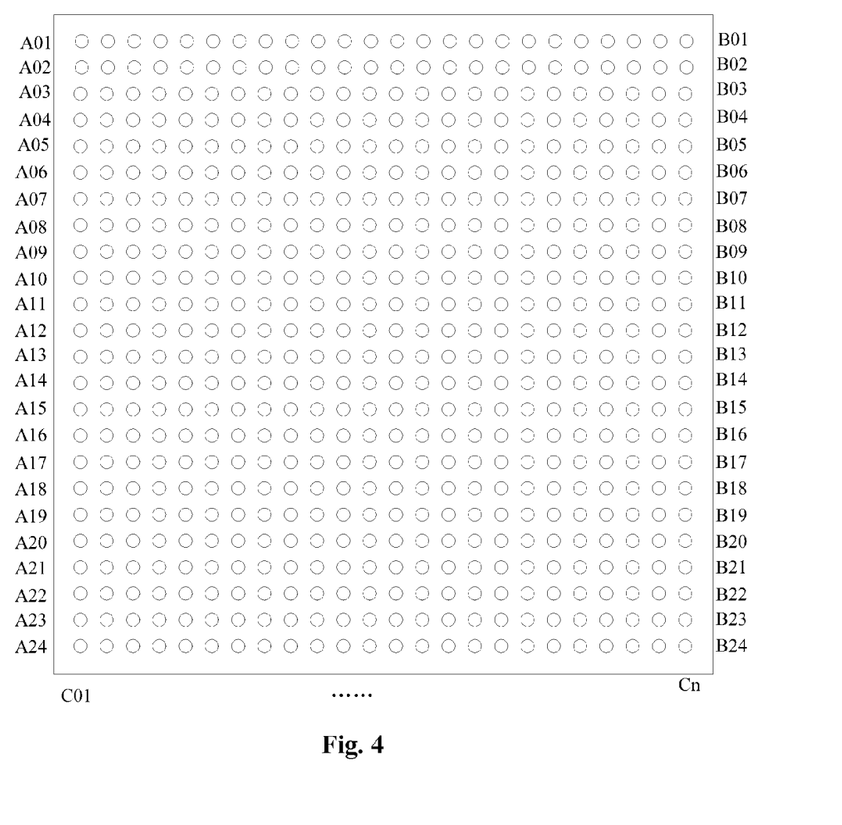
FIG. 4 is a diagram illustrating distribution of external line optical fibers in a case that a butting plate in an apparatus for butting optical fiber cores according to an embodiment of the disclosure is a 24*24 optical fiber core matrix butting plate.

Each line connector includes a first slide bar, and a first line fiber core connector and a second line fiber core connector both of which may slide along the first slide bar. An input end and an output end of the first line fiber core connector are connected through a connection optical fiber. An input end and an output end of the second line fiber core connector are connected through a connection optical fiber. But the first line fiber core connector is not connected to the second line fiber core connector. When working, each of the line fiber core connectors may fix an end of an external line optical fiber core, and thus each line connector may fix two external line optical fiber cores. Accordingly each line connector may correspond to two external line optical fibers. Thus, in a case that the apparatus for butting optical fiber cores according to the embodiment of the disclosure includes an optical fiber core butting plate with 24*24 butting devices, there are 24 line connectors, and at most 48 external line optical fibers may be connected. The 48 external line optical fibers are provided at opposite sides of the butting plate, i.e., A01~A24 and B01~B24, as shown in FIG. 4. Generally, A01~A24 are odd rows of line optical fibers, and B01~B24 are even rows of line optical fibers which is not limited herein.

The multiple cord connectors (C01-Cn, where n is a positive integer no less than 2) in the apparatus for butting optical fiber cores according to the embodiment of the disclosure are provided on the other side of the butting plate, and the installation direction of the second slide bar in the cord connector is perpendicular to that of the first slide bar. The first cord fiber core connector and the second cord fiber core connector are connected through a connection optical fiber. Thus, the first cord fiber core connector and the second cord fiber core connector in the cord connector may be driven, through controlling the manipulator, to be connected respectively to line fiber core connectors fixing different line optical fiber cores, so as to form an optical path between the line fiber core connectors fixing different line optical fiber cores, and the cord connector connected to the line fiber core connectors fixing different line optical fiber cores. Thereby, transmission and exchange of data information between different line optical fibers is achieved.

Figure 5:
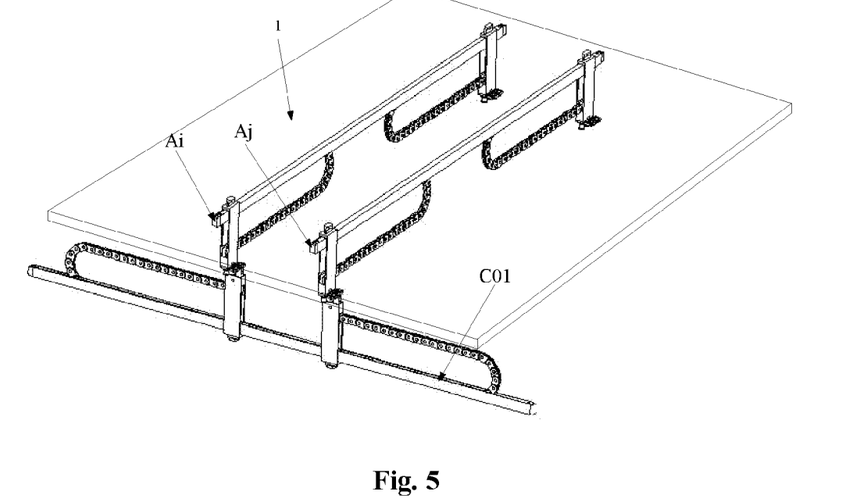
FIG. 5 is a structure diagram illustrating the butting of any two line optical fibers of external line optical fibers A01-A24, using an apparatus for butting optical fiber cores according to an embodiment of the disclosure.

Specific examples are used for illustration. For example, FIG. 5 illustrates how to realize exchange between external line optical fibers Ai and Aj. The first cord fiber core connector in the cord connector C01 is moved, through a manipulator, to a location on the butting plate where the first line fiber core connector of the line connector connected to the external line optical fiber Ai is located, and thus the first cord fiber core connector butts the first line fiber core connector which fixes one end of the external line optical fiber Ai core. Meanwhile, the second cord fiber core connector of the cord connector C01 is moved, through a manipulator, to a location on the butting plate where the first line fiber core connector of the line connector connected to the external line optical fiber Aj is located, and thus the second cord fiber core connector butts the first line fiber core connector which fixes one end of the external line optical fiber Aj core. The first cord fiber core connector and the second cord fiber core connector in the cord connector C01 are connected through a connection optical fiber. Thereby, an optical path may be formed among the external line optical fiber Ai, the first line fiber core connector fixing one end of the external line optical fiber Ai core, the first cord fiber core connector in the cord connector C01, the second cord fiber core connector in the cord connector C01, the first line fiber core connector fixing one end of the external line optical fiber Aj core, and the external line optical fiber Aj, and butting and exchange of data information between the external line optical fiber Ai and the external line optical fiber Aj is achieved. Here, both i and j are any integer between 1 and 24, inclusive, and i is not equal to j.

Figure 6:
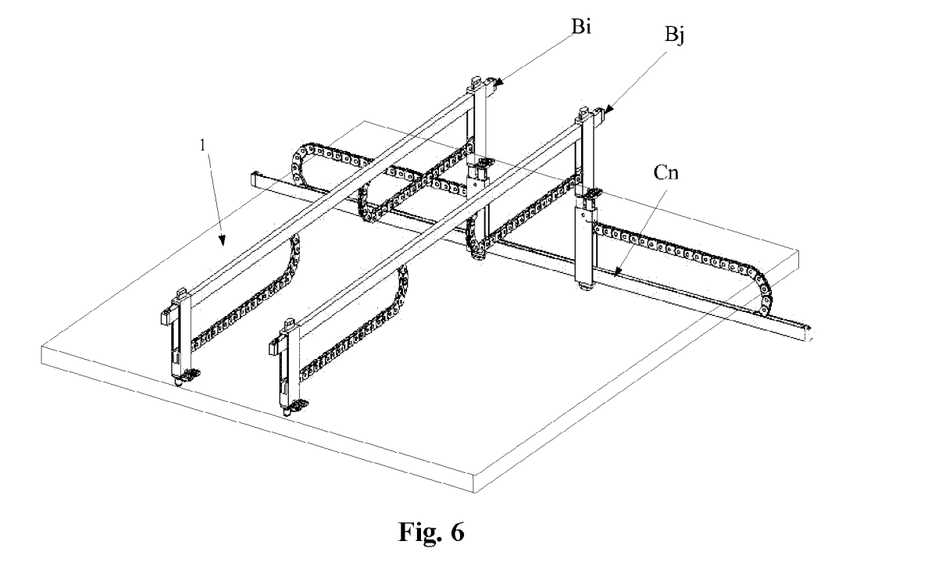
FIG. 6 is a structure diagram illustrating the butting of any two line optical fibers of external line optical fibers B01-B24, using an apparatus for butting optical fiber cores according to an embodiment of the disclosure.

Similarly, FIG. 6 illustrates how to realize the exchange between external line optical fibers Bi and Bj. The external line optical fiber Bi corresponds to a line connector installed on the i-th row of butting holes of the butting plate, and is connected to the input end of the second line fiber core connector of the line connector. The external line optical fiber Bj corresponds to a line connector installed on the j-th row of butting holes of the butting plate, and is connected to the input end of the second line fiber core connector of the line connector. Thus, the first cord fiber core connector of the cord connector Cn is moved, through a manipulator, to a location on the butting plate, where the second line fiber core connector of the line connector connected to the external line optical fiber Bi is located. Thus the first cord fiber core connector butts the second line fiber core connector which fixes one end of the external line optical fiber Bi core. Meanwhile, the second cord fiber core connector of the cord connector Cn is moved to a location on the butting plate where the second line fiber core connector of the line connector connected to the external line optical fiber Bj is located. Thus the second cord fiber core connector butts the second line fiber core connector which fixed one end of the external line optical fiber Bj core. The first cord fiber core connector and the second cord fiber core connector of the cord connector Cn are connected through a connection optical fiber. Thereby, an optical path may be formed among the external line optical fiber Bi, the second line fiber core connector fixing one end of the external line optical fiber Bi core, the first cord fiber core connector of the cord connector Cn, the second cord fiber core connector of the cord connector Cn, the second line fiber core connector fixing one end of the external line optical fiber Bj core, and the external line optical fiber Bj, and butting and exchange of data information between the external line optical fiber Bi and the external line optical fiber Bj is achieved. Here, both i and j are any integer between 1 and 24, inclusive, and i is not equal to j.

It may be seen that, in the apparatus for butting optical fiber cores according to the embodiment of the disclosure, the first line fiber core connector or the second line fiber core connector which fixes the external line optical fiber core are gripped, by the manipulator, to move on the butting plate. And the first cord fiber core connector and the second cord fiber core connector of the cord connector are gripped, by the manipulator, to move on the butting plate. Thus a cord connector butts a first line fiber core connector or a second line fiber core connector which fixes respectively two different external line optical fiber cores, and automatic butting for two external line optical fiber cores are realized. The operation is simple, manual intervention is greatly reduced, a large amount of manpower and materials are saved, and work efficiency is improved.

Further, in the apparatus for butting optical fiber cores according to the embodiment of the disclosure, in the direction perpendicular to the extension direction of the second slide bar of the cord connector, the butting between any two of multiple different line optical fibers is realized with one cord connector, thus usage of cord optical fibers is greatly reduced, and cost is decreased.

Figure 7:
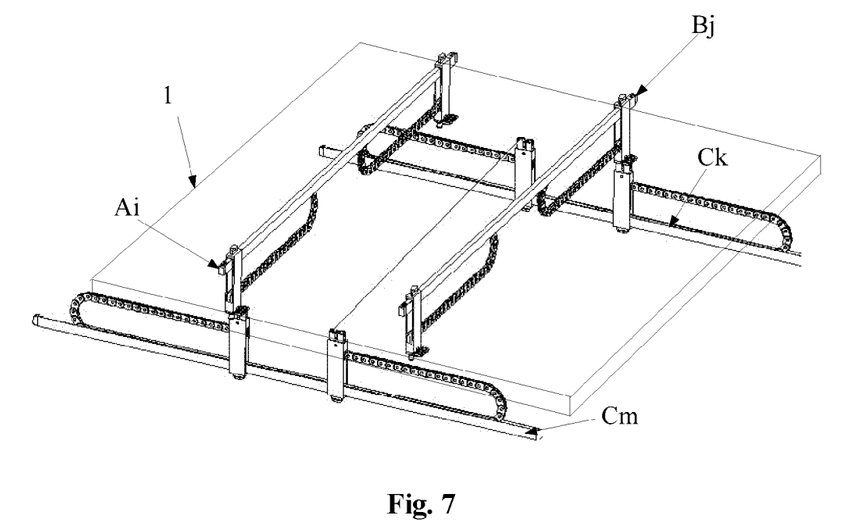
FIG. 7 is a structure diagram illustrating the butting of any one line optical fiber of external line optical fibers A01-A24 and any one line optical fiber of external line optical fibers B01-B24 using an apparatus for butting optical fiber cores according to an embodiment of the disclosure.

In additional, FIG. 7 illustrates how to realize the exchange between external line optical fibers Ai and Bj. The external line optical fiber Ai corresponds to a line connector installed on the i-th row of butting holes of the butting plate, and is connected to the input end of the first line fiber core connector of the line connector. The external line optical fiber Bj corresponds to a line connector installed on the j-th row of butting holes of the butting plate, and is connected to the input end of the second line fiber core connector of the line connector. Thus, the first cord fiber core connector of the cord connector Cm (m is a positive integer greater than 1 and less than n) is moved along the column direction, by controlling a manipulator, and the first line fiber core connector fixing one end of the external line optical fiber Ai core is moved along the row direction, by controlling a manipulator. Thus, the first cord fiber core connector of the cord connector Cm butts the first line fiber core connector fixing one end of the external line optical fiber Ai core. Meanwhile, the second cord fiber core connector of the cord connector Ck (k is a positive integer greater than 1 and less than n, and not equal to m) is moved along the column direction, by controlling a manipulator, and the second line fiber core connector fixing one end of the external line optical fiber Bj core is moved along the row direction, by controlling a manipulator. Thus, the second cord fiber core connector of the cord connector Ck butts the second line fiber core connector fixing one end of the external line optical fiber Bj core. Then, the second cord fiber core connector of the cord connector Cm and the first cord fiber core connector of the cord connector Ck are connected in advance through a tail fiber on the butting plate. Hence, an optical path may be formed among the external line optical fiber Ai, the first line fiber core connector fixing one end of the external line optical fiber Ai core, the first cord fiber core connector of the cord connector Cm, the second cord fiber core connector of the cord connector Cm, the tail fiber connecting the second cord fiber core connector of the cord connector Cm and the first cord fiber core connector of the cord connector Ck, the first cord fiber core connector of the cord connector Ck, the second cord fiber core connector of the cord connector Ck, the second line fiber core connector fixing one end of the external line optical fiber Bj core, and the external line optical fiber Bj, and butting and exchange of data information between the external line optical fiber Ai and the external line optical fiber Bj is achieved. Here, both i and j are any integer between 1 and 24, inclusive, and i is not equal to j.

In conclusion, in the apparatus for butting optical fiber cores according to the embodiment of the disclosure, in the direction perpendicular to the extension direction of the second slide bar of the cord connector, the butting between any two (Ai and Aj, or, Bi and Bj) of multiple different line optical fibers is realized with one cord connector, thus usage of cord optical fibers is greatly reduced, and cost is decreased. In addition, in a case that the connector for butting optical fiber cores according to the embodiment of the disclosure includes 24 cord connectors, the butting between 12 groups of line optical fibers arbitrarily divided among A01~A24 and automatic butting between 12 groups of line optical fibers arbitrarily divided among B01~B24 can be achieved.

In addition, in a case that C01-C12 and C13-C24 of the 24 cord connectors on the butting plate are connected respectively through a tail fiber, automatic butting for 24 groups of external line optical fibers consisting of the external line optical fibers A01~A24 and the external line optical fibers B01~B24 may be realized, i.e., automatic full-butting for all connected external line optical fibers may be realized. It should be noted that, C01-C12 are not required to correspond to C13-C24 strictly, so long as one of the two cord connectors to be butted is located in the region where C01-C12 are located, and the other one is located in the region where C13-C24 are located. A01~A24 are not required to correspond to B01~B24 strictly either, so long as one of the two external line optical fibers for butting is selected from the external line optical fibers A01~A24, and the other one is selected from the external line optical fibers B01~B24. It should be also noted that, according to an embodiment of the disclosure, to avoid signal interference between the external line optical fiber Ai and the external line optical fiber Bi when automatic full-exchange is performed, i.e., automatic butting for the 24 groups of external line optical fibers consisting of the external line optical fibers A01~A24 and the external line optical fibers B01~B24 is realized, each of the first line fiber core connectors connected to the external line optical fibers A01~A24 can only move in half of the region on a side of the butting plate close to the external line optical fibers A01~A24, and each of the second line fiber core connectors connected to the external line optical fibers B01~B24 can only move in half of the region on a side of the butting plate close to the external line optical fibers B01~B24.

In conclusion, in the apparatus for butting optical fiber cores according to the embodiment of the disclosure, automatic butting between different line optical fibers in an optical fiber network may be realized, and automatic full-butting between different line optical fibers in the optical fiber network may be also realized. The operation is simple, a large amount of manpower and materials are saved, and work efficiency is improved.

A Second Embodiment

Figure 8:
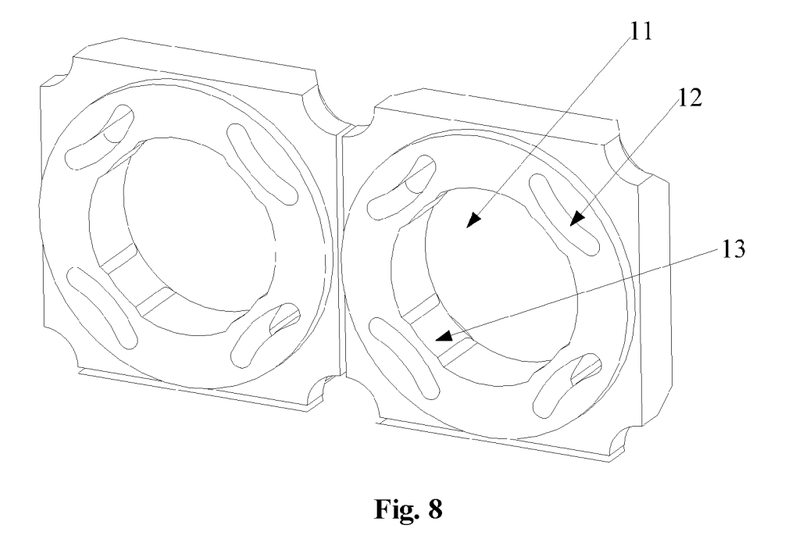
FIG. 8 is a structure diagram of a butting device of an apparatus for butting optical fiber cores according to an embodiment of the disclosure.

The basic structure of the connector for butting optical fiber cores provided according to the embodiment of the disclosure is similar to that in the first embodiment. Differences lie in that, as shown in FIG. 8, the butting device further includes: multiple arc-shaped holes 12 distributed around the circumference of each of the butting holes 11, where two ends of each of the arc-shaped holes 12 get far away from the butting holes 11; and multiple embossments 13 which are provided on an inner wall of each of the butting holes 11, along radial directions of the arc-shaped holes 12, and opposite to the arc-shaped holes 12, where each of the embossments 13 corresponds to a respective one of the arc-shaped holes 12.

Preferably, the arc-shaped holes 12 are evenly distributed around the circumference of each of the butting holes 11, and more preferably, the number of the arc-shaped holes 12 is 4. The disclosure is not limited.

The portion of the line fiber core connector which is inserted into the butting hole, and the portion of the cord fiber core connector which is inserted into the butting hole, have the same diameter as the butting hole. Thus, in the technical solution according to the embodiment of the disclosure, when the line fiber core connector is inserted into the butting hole and the cord fiber core connector is inserted into the butting hole, the embossments will squeeze, along radial directions of the arc-shaped holes 12, the line fiber core connector and the cord fiber core connector inserted into the butting hole, to increase contact pressure between the embossments and any portion inserted into the butting hole. Thus stability between the line fiber core connector and the cord fiber core connector is improved when optical signal is exchanged through the butting hole.

It should be noted that, the butting plate according to the embodiment of the disclosure is proposed mainly for the butting of optical fiber cores in the optical fiber communication network, and may be made of materials such as stainless steel, aluminum alloy, or glass, which are sturdy and durable, and the processing difficulty is taken into account. In addition, for different requirements, butting plates with different amounts of butting holes may be customized based on actual situations in specific implementations.

A Third Embodiment

Figure 9:
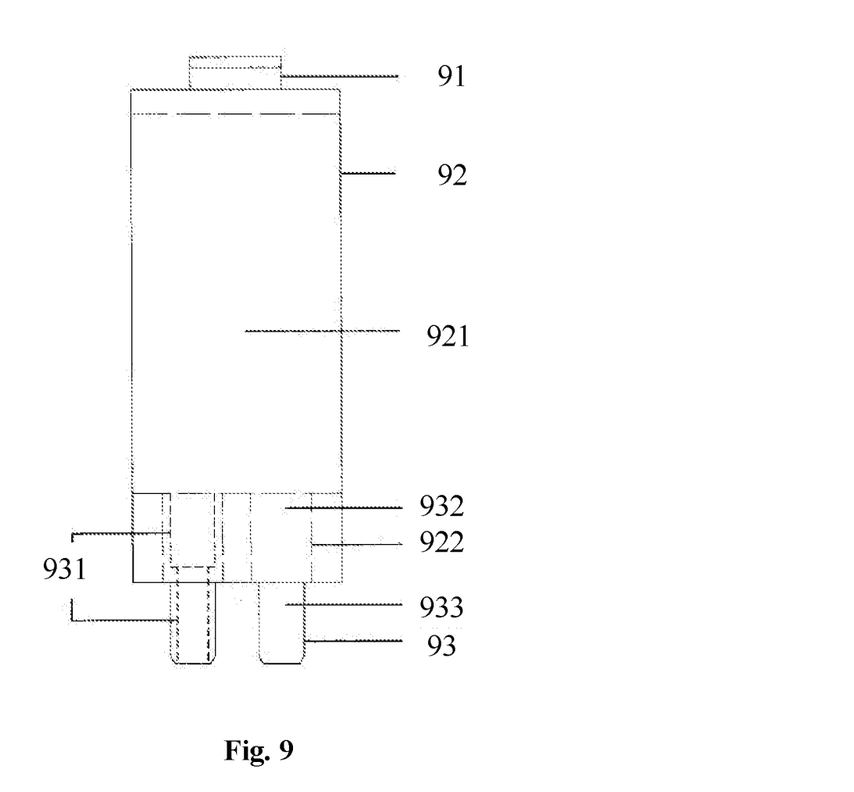
FIG. 9 is a structure diagram of a fiber core connector of an apparatus for butting optical fiber cores according to an embodiment of the disclosure.

The basic structure of the apparatus for butting optical fiber cores provided according to the embodiment of the disclosure is similar to the structure in the first embodiment. Differences lie in that, as shown in FIG. 9, the fiber core connector includes: a connecting portion 91; a fixing portion 92, where a cavity 921 is provided in the fixing portion 92 and passes through the fixing portion 92 from left side to right side of the fixing portion 92, and two through-holes 922 are provided side-by-side at the bottom of the cavity 921, and the through-holes 922 are exposed from the fiber core connector; two optical fiber core connecting flanges 93, where one end of each of the optical fiber core connecting flanges 93 is fixed in a through-hole 922, the other end is provided with a second cylinder portion 933 for fixing an external optical fiber core, and at least one optical fiber core connecting flange 93 is provided with a stepped hole 931 inside. Specifically, each of the optical fiber core connecting flanges 93 includes a first cylinder portion 932 and a second cylinder portion 933. The first cylinder portion 932 is fixed in a through-hole 922, and a diameter of the first cylinder portion 932 is the same as a diameter of the through-hole 922 and is greater than a diameter of the second cylinder portion 933. The first cylinder portion 932 and the second cylinder portion 933 may be manufactured integrally, or may be manufactured separately and then combined. The disclosure is not limited herein.

It should be noted that, the fiber core connector according to the embodiment of the disclosure may be the first cord fiber core connector or the second cord fiber core connector of the cord connector, or may be the first line fiber core connector or the second line fiber core connector of the line connector, and the disclosure is not limited herein. In specific implementations, the core of a connection optical fiber, which passes through the drag chain 3, enters the through-cavity 921 from a side of the fiber core connector, and is inserted into a connecting flange 93 through a part of the stepped hole 931 corresponding to the first cylinder portion 932 of the connecting flange 93, and exits from another part of the stepped hole 931 corresponding to the second cylinder portion 933 of the connecting flange 93. The second cylinder portion 933 is configured to fix the fiber core of the connection optical fiber. During butting, the fiber core connector moves down, and the second cylinder portion 933 of the connecting flange 93 is inserted into a butting hole, so that the optical fiber core fixed by the second cylinder portion 933 of the cord fiber core connector (i.e., the first cord fiber core connector or the second cord fiber core connector) butts the optical fiber core fixed by the second cylinder portion 933 of the line fiber core connector (i.e., the first line fiber core connector or the second line fiber core connector).

Those skilled in the art should understand that, according to the embodiment of the disclosure, the size of the cavity 921 may be adjusted based on actual requirements. Further, the shape of the through-holes 922 may be a cylinder, and may be other shapes according to other embodiments. The disclosure is not limited herein.

A Fourth Embodiment

Figure 10:
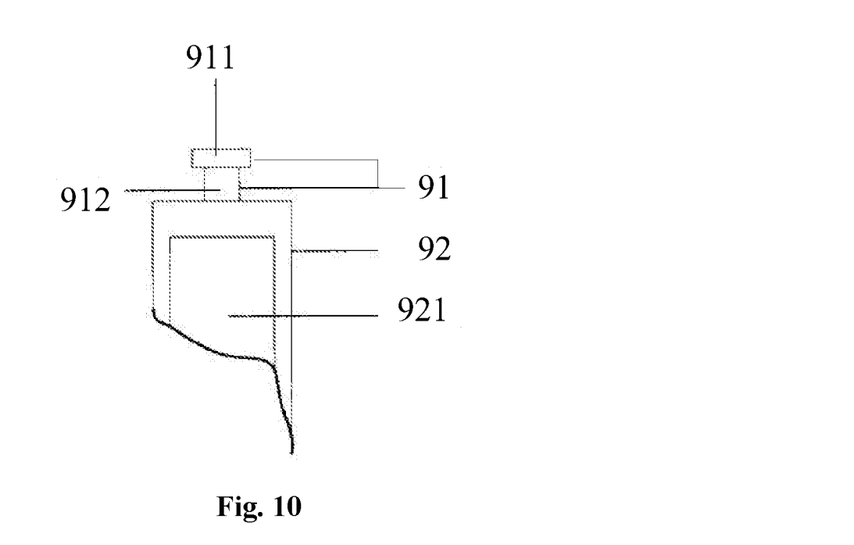
FIG. 10 is a structure diagram of a connecting portion of a fiber core connector of an apparatus for butting optical fiber cores according to an embodiment of the disclosure.

Based on the second embodiment, in order to make an external device grip the connecting portion 91 of the fiber core connector better, to drive the fiber core connector to move, the connecting portion 91 of the fiber core connector according to the embodiment of the disclosure includes an upper part and a lower part, as shown in FIG. 10. In the direction perpendicular to the passing-through direction of the cavity 921, a cross section area of the upper part of the connecting portion 91 is larger than a cross section area of the lower part of the connecting portion 91, thus a groove shape is formed by the upper part of the connecting portion 91, the lower part of the connecting portion 91, and the fixing portion 92. Thus the external device may conveniently grip the fiber core connector to move up and down by means of the groove formed through the lower part of the connecting portion 91.

A Fifth Embodiment

Figure 11:
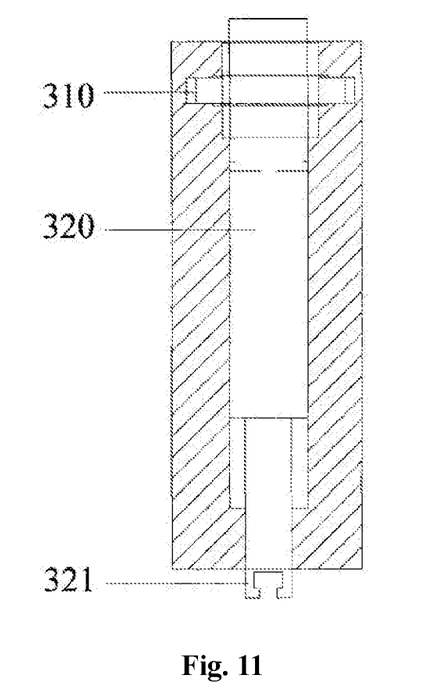
FIG. 11 is a structure diagram of a manipulator of an apparatus for butting optical fiber cores according to an embodiment of the disclosure.

The basic structure of the apparatus for butting optical fiber cores provided according to the embodiment of the disclosure is similar to the structure in the first embodiment. Differences lie in that, as shown in FIG. 11, the manipulator 3 includes a first transmission gear 310, and a plug 320 which is homocentric with the first transmission gear 310 and is embedded partly in the first transmission gear 310. Internal threads are provided in the joint portion of the first transmission gear 310 to join the plug 320, and external threads matching the internal threads of the first transmission gear 310 are provided in the corresponding portion of the plug 320, i.e., an upper part of the plug 320 forms a screw structure. The first transmission gear 310 and the plug 320 cooperate to each other to form a thread-screw structure. A grip portion 321 is provided in a lower part of the plug 320. The grip portion 321 is configured to grip the fiber core connector. Those skilled in the art should understand that, in the embodiment, the connection between the first transmission gear 310 and the plug 320 through the thread and screw is just a preferable mode among multiple connection modes, and the disclosure is not limited herein, as long as a transverse rotation of the first transmission gear 310 may drive the plug 320 to move up and down. When rotating transversely, the first transmission gear 310 drives the plug 320 to move up and down through the thread connection, i.e., the plug 320 has a displacement relative to the first transmission gear 310, so as to grip the fiber core connector to move up and down, and insert the fiber core connector into the butting hole of the butting plate, or pull the fiber core connector out of the butting hole.

A Sixth Embodiment

Figure 12:
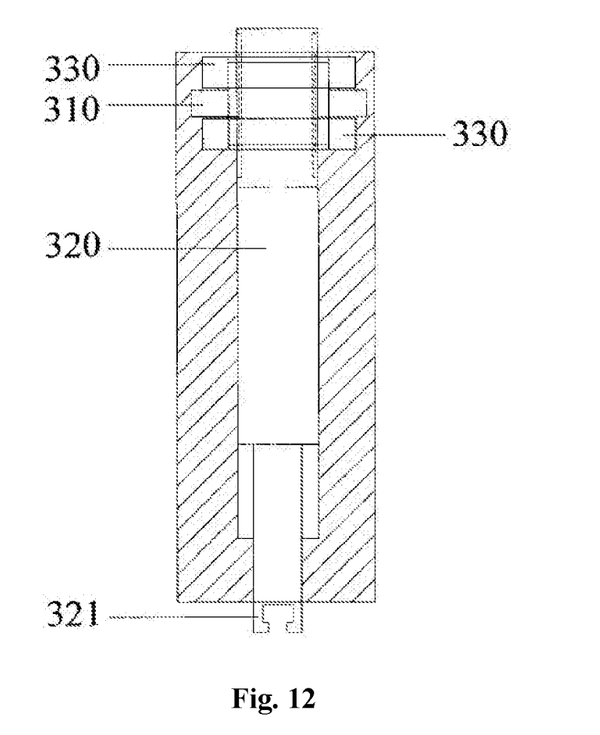
FIG. 12 is a structure diagram of a manipulator of an apparatus for butting optical fiber cores according to another embodiment of the disclosure.

To better control the plug 320 based on the fourth embodiment to move up and down, the position of the first transmission gear 310 has to be unchanged, i.e., only when the position of the first transmission gear 310 is relatively fixed, the plug 320 may be driven to relatively move up and down through a screw joint structure of the first transmission gear 310 and the plug 320. In view of this, as shown in FIG. 12, in an apparatus for butting optical fiber cores according to the embodiment of the disclosure, the manipulator 3 further includes two bearings 330 which are provided on a top surface and a bottom surface of the first transmission gear 310 and are configured to fix the first transmission gear 310. When being externally driven to rotate transversely, the first transmission gear 310 can only rotate transversely around the center of the first transmission gear 310 at its original position due to fixation of the two bearings 330 which are configured to fix the first transmission gear 310. Meanwhile, since the first transmission gear 310 and the plug 320 are connected through threads, the plug 320 can only move up and down relative to the butting hole under the function of the thread structure when the first transmission gear 310 rotates transversely. Thus it ensure that the manipulator 3 only grips the fiber core connector up and down. Then, an external driving device drives the manipulator 3 and the fiber core plug to move along the first slide bar or along the second slide bar in the direction parallel to the first slide bar or the second slide bar.

Those skilled in the art should understand that, according to the embodiment of the disclosure, the bearings 330 which are configured to fix the first transmission gear 310 are preferable, but the disclosure is not limited herein, as long as the first transmission gear 310 may be fixed and the transverse rotation of the first transmission gear 310 is not influenced.

A Seventh Embodiment

Figure 13:
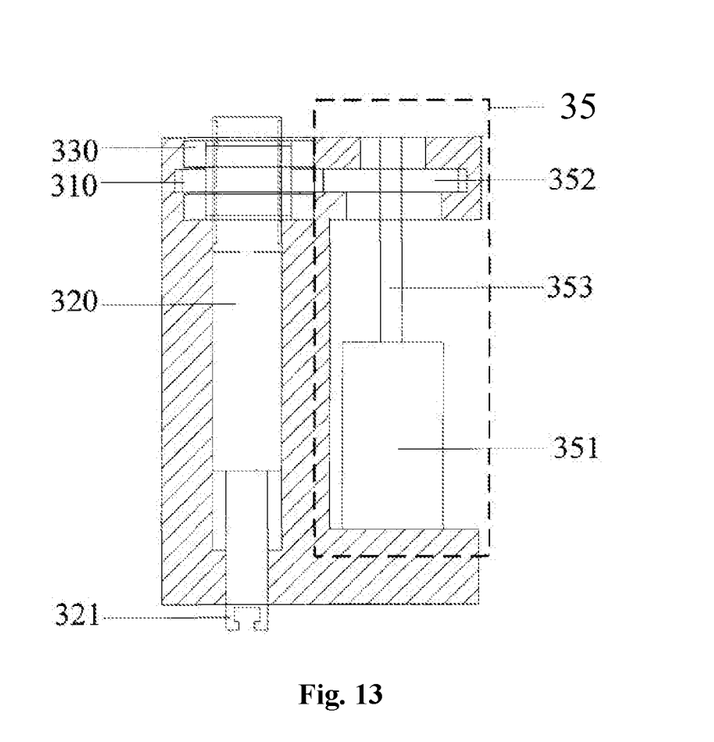
FIG. 13 is a structure diagram of a manipulator of an apparatus for butting optical fiber cores according to still another embodiment of the disclosure.

Based on forgoing embodiments, as shown in FIG. 13, in an apparatus for butting optical fiber cores according to the embodiment of the disclosure, the manipulator 3 further includes a driving portion 35 configured to drive the first transmission gear 310 to rotate transversely. The driving portion 35 includes a motor 351, a second transmission gear 352 and a power output portion 353. The second transmission gear 352 engages with the first transmission gear 310, and is fixedly connected to the power output portion 353 of the motor 351, so that the motor 351 may drive the second transmission gear 352 to rotate transversely, and in turn drive the first transmission gear 310 to rotate transversely. Preferably, the motor 351 according to the embodiment of the disclosure is a stepper motor. In a specific operation, automatic rotation of the motor is passed to the second transmission gear 352 through the power output portion 353, thus the second transmission gear 352 is driven to rotate transversely with the motor. Since the second transmission gear 352 engages with the first transmission gear 310, the first transmission gear 310 rotates transversely in a direction opposite to that of the second transmission gear 352 when the second transmission gear 352 rotates transversely. Since the first transmission gear 310 and the plug 320 are connected through the thread-screw structure, the plug 320 will move up and down when the first transmission gear 310 rotates transversely. Thus, the connecting portion which grips the fiber core connector may drive the fiber core connector to move in the butting hole in the plug and pull mode.

According to the embodiment of the disclosure, the grip portion 321 is made of a ductile material, so that when the grip portion 321 moves downwards to the upper part of the connecting portion which serves as a hamper, two sidewalls of the grip portion 321 tilt towards two sides along directions perpendicular to planes where the two sidewalls locate. Then the grip portion 321 moves to the lower part of the connecting portion across the upper part of the connecting portion. Since a cross section area of the lower part of the connecting portion is smaller than that of the upper part of the connecting portion, the grip portion 321, which has crossed the upper part of the connecting portion, locks a groove formed between the upper part of the connecting portion and the lower part of the connecting portion, to grip the connecting portion.

In conclusion, in the apparatus for butting optical fiber cores according to the embodiment of the disclosure, the first cord fiber core connector and the second cord fiber core connector of the cord connector are gripped by a manipulator to move to output ends of the first line fiber core connectors (or the second line fiber core connectors) connected to different line fiber cores, and then the first cord fiber core connector and the second cord fiber core connector of the cord connector butt output ends of the first line fiber core connectors (or the second line fiber core connectors) connected to different line fiber cores. Thus an optical path between different lines is formed based on the first line fiber core connectors (or the second line fiber core connectors) connected to different line fiber cores and the butted cord connectors. Automatic butting for different line optical fibers in the optical fiber network is realized, the operation is simple, manual intervention is greatly reduced, a large amount of manpower and materials are saved, and work efficiency is improved.

The embodiments of the disclosure are described in a progressive manner, each embodiment focuses on differences from other embodiments, and for the same or similar parts, other embodiments may be referred to.

The forgoing description of the embodiments of the disclosure, allows those skilled in the art to implement or use the disclosure. A variety of modifications to the embodiments are apparent for those skilled in the art, and the general principles defined in the disclosure may be implemented in other embodiments without departing from the spirit and scope of the disclosure. Hence, the disclosure is not limited to the embodiments shown in the disclosure, but conforms to a widest scope consistent with the principles and novel features in the disclosure.

The invention claimed is:

1. An apparatus for butting optical fiber cores, comprising:
  a butting plate with a plurality of butting devices, wherein each of the plurality of butting devices comprises a butting hole in a center of the butting device;
  a connector for butting the optical fiber cores, wherein the connector for butting the optical fiber cores is fixed on the butting plate and comprises a plurality of line connectors parallel to each other and a plurality of cord connectors parallel to each other, wherein each of the plurality of line connectors comprises a first slide bar, a first line fiber core connector and a second line fiber core connector, both of the first line fiber core connector and the second line fiber core connector being slidable along the first slide bar, an input end and an output end of the first line fiber core connector being connected to each other through a connection optical fiber, an input end and an output end of the second line fiber core connector being connected to each other through a connection optical fiber, and the first line fiber core connector and the second line fiber core connector are configured to be disconnected from each other, and wherein each of the plurality of cord connectors comprises a second slide bar, a first cord fiber core connector and a second cord fiber core connector, both of the first cord fiber core connector and the second cord fiber core connector being slidable along the second slide bar, the first cord fiber core connector and the second cord fiber core connector being connected to each other through a connection optical fiber; and
  a manipulator configured to grip the fiber core connectors and drive the fiber core connectors to move.

2. The apparatus for butting optical fiber cores according to claim 1, wherein each of the plurality of butting devices further comprises:
  a plurality of arc-shaped holes distributed around a circumference of each of the butting holes, wherein two ends of each of the plurality of arc-shaped holes are disposed at a larger distance from the butting hole; and
  a plurality of embossments provided, along radial directions of the plurality of arc-shaped holes and opposite to the arc-shaped holes, on an inner wall of each of the butting holes, wherein each of the plurality of embossments corresponds to a respective one of the plurality of are-shaped holes.

3. The apparatus for butting optical fiber cores according to claim 2, wherein the plurality of arc-shaped holes are evenly distributed around the circumference of the hutting hole.

4. The apparatus for butting optical fiber cores according to claim 3, wherein number of the plurality of arc-shaped holes is 4.

5. The apparatus for butting optical fiber cores according to claim 1, further comprising a drag chain for wrapping the connection optical fiber.

6. The apparatus for butting optical fiber cores according to claim 1, wherein each of the fiber core connectors comprises:
  a connecting portion;
  a fixing portion having a cavity, wherein the cavity passes through the fixing portion from left side to right side of the fixing portion, and two through-holes are provided side-by-side at the bottom of the cavity; and
  two optical fiber core connecting flanges, wherein one end of each of the optical fiber core connecting flanges is fixed in one of the through-holes, the other end-includes a second cylinder portion for fixing an external optical fiber core, and at least one of the optical fiber core connecting flanges has a stepped through-hole.

7. The apparatus for butting optical fiber cores according to claim 6, wherein the connecting portion comprises an upper part and a lower part, and in a direction perpendicular to a passing-through direction of the cavity, a cross section area of the upper part of the connecting portion is larger than a cross section area of the lower part of the connecting portion, and a groove shape is formed by the upper part of the connecting portion, the lower part of the connecting portion, and the fixing portion.

8. The apparatus for batting optical fiber cores according to claim 1, wherein the manipulator comprises:
  a first transmission, gear and a plug which is embedded partly in the first transmission gear, wherein embedding portions of the first transmission gear and thy plug form a thread-screw structure, and the plug has a grip portion in a lower part of the plug to grip the fiber core connectors.

9. The apparatus for butting optical fiber cores according to claim 8, wherein the manipulator further comprises:
  two bearings which are provided on as top surface and a bottom surface of the first transmission gear to fix the first transmission gear.

10. The apparatus for butting optical fiber cores according to claim 8, wherein the manipulator further comprises:
  a second transmission gear engaging with the first transmission gear, wherein, when rotating transversely, the second transmission gear drives the first transmission gear to rotate transversely in a direction opposite to as direction in which the second transmission gear rotates transversely; and
  a power output portion fixedly connected to the second transmission gear to transfer kinetic energy to the second transmission gear; and
  a motor fur driving the power output portion.

* * * * *

UNITED STATES PATENT AND TRADEMARK OFFICE
CERTIFICATE OF CORRECTION

PATENT NO. : 9,703,049 B2
APPLICATION NO. : 14/908088
DATED : July 11, 2017
INVENTOR(S) : Xuefeng Fan et al.

Page 1 of 1

It is certified that error appears in the above-identified patent and that said Letters Patent is hereby corrected as shown below:

In the Claims

In Claim 2, Column 14, Line 3, replace the words "are-shaped" with the words "arc-shaped".

In Claim 3, Column 14, Line 6, replace the word "hutting" with the word "butting".

In Claim 8, Column 14, Line 37, replace the word "batting" with the word "butting".

In Claim 8, Column 14, Line 41, replace the word "thy" with the word "the".

In Claim 9, Column 14, Line 47, replace the words "as top" with the words "a top".

In Claim 10, Column 14, Line 55, at the end of the line replace the word "as" with the word "a".

In Claim 10, Column 14, Line 61, replace the word "fur" with the word "for".

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*